(12) United States Patent
Wang et al.

(10) Patent No.: US 7,860,202 B2
(45) Date of Patent: Dec. 28, 2010

(54) METHOD AND CIRCUIT FOR TRANSFERRING DATA STREAM ACROSS MULTIPLE CLOCK DOMAINS

(75) Inventors: Gyh-Bin Wang, HsinChu (TW); Hsien-Sheng Huang, HsinChu (TW)

(73) Assignee: Etron Technology, Inc., HsinChu (TW)

( * ) Notice: Subject to any disclaimer, the term of this patent is extended or adjusted under 35 U.S.C. 154(b) by 1294 days.

(21) Appl. No.: 11/402,800

(22) Filed: Apr. 13, 2006

(65) Prior Publication Data

US 2007/0257877 A1 Nov. 8, 2007

(51) Int. Cl.
*H04L 7/00* (2006.01)

(52) U.S. Cl. ........................ 375/354; 375/355
(58) Field of Classification Search .......... 375/226, 375/354–355, 371, 373, 377; 370/105.3, 370/503, 516; 702/69; 365/233.1, 233.11; 712/225; 713/400–401, 500, 503, 600; 709/231, 709/232; 327/9, 33, 45, 91, 94; 326/86, 326/297; 341/100; 345/98
See application file for complete search history.

(56) References Cited

U.S. PATENT DOCUMENTS

| | | | | |
|---|---|---|---|---|
| 5,198,748 A * | 3/1993 | Tsui et al. | ................. | 324/76.35 |
| 5,256,912 A * | 10/1993 | Rios | ........................... | 327/144 |
| 5,778,217 A * | 7/1998 | Kao | ........................... | 713/503 |
| 6,006,286 A * | 12/1999 | Baker et al. | .................... | 710/22 |
| 6,911,843 B2 * | 6/2005 | Mizumoto et al. | ............ | 326/86 |
| 7,062,733 B1 * | 6/2006 | Poskatcheev et al. | .......... | 716/6 |
| 7,085,950 B2 * | 8/2006 | Ehmann et al. | ............. | 713/503 |
| 7,363,526 B1 * | 4/2008 | Chong et al. | ................. | 713/401 |
| 2004/0163006 A1 * | 8/2004 | Rosen | ........................ | 713/401 |
| 2004/0184572 A1 * | 9/2004 | Kost et al. | .................... | 375/354 |
| 2005/0066142 A1 * | 3/2005 | Bhattacharya et al. | ....... | 711/169 |
| 2006/0146967 A1 * | 7/2006 | Panikkar et al. | ............. | 375/355 |
| 2007/0079167 A1 * | 4/2007 | Lemos | ....................... | 713/600 |

* cited by examiner

*Primary Examiner*—Tesfaldet Bocure
*Assistant Examiner*—Lawrence B Williams
(74) *Attorney, Agent, or Firm*—Muncy, Geissler, Olds & Lowe, PLLC

(57) ABSTRACT

The method and circuit provide an effective implementation to handle the data transferring problem between multiple clock domains. A shift circuit shifts the incoming data stream, which comprises N parallel signals divided into a first group of parallel signals and a second group of parallel signals, to be in accordance with a first sequence of N sampling pulses, and a sampling module sequentially samples each signal in the first group signals and the second group signals with the N sampling pulses in a second sequence and outputs a serial signal.

20 Claims, 11 Drawing Sheets shifting the second group parallel signal — S11 sequentially sampling and outputting each signal in the first group parallel signals and the shifted second group digital signals by the N sampling pulses with a second sequence — S12

METHOD AND CIRCUIT FOR TRANSFERRING DATA STREAM ACROSS MULTIPLE CLOCK DOMAINS

BACKGROUND OF THE INVENTION

1. Field of the Invention

The present invention relates to a method and circuit for transferring data, and more especially, to a method and circuit for transferring data stream across multiple clock domains.

2. Background of the Related Art

It's quite common to transfer data stream in multiple clock domains in the electronic circuit. For example, referring to FIG. 1A, it depicts a circuit for transferring data in three clock domains. The data stream data_0 10 in domain D 14 is first sampled by sampling pulse clk1 17 to become a data stream data_1 11 in domain D+1 15; thereafter, the data stream data 111 is sampled by sampling pulse clk2 18 to become the data stream data_2 12 in domain D+2 16, and then the data stream data_2 12 is sampled by sampling pulse clk3 19 to become the data stream data_3.

Moreover, even though the frequency for all sampling clocks are the same, the skew and jitter may still happen around the sampling edges of different clocks (as shown in FIG. 1B, there is skew or jitter happened on the rising or falling edge of sampling pulse clk2 18, even the frequency of sampling pulse clk1 17 is equal to that of sampling pulse clk2 18) and such skew or jitter causes the phase difference and sampling ambiguity.

However, since the frequencies of sampling pulse clk1 17, clk2 18, and clk3 19 may be different, that makes the sampling ambiguity more serious in sampling processes. For example, as shown in FIG. 2, a first data stream comprises several frames (K−1, K, K+1), and each frame comprises 3 parallel bits, bit0, bit1 and bit2. The first data stream may be originally sampled by a sampling pulse clk1 and then sampled by faster sampling pulses clk2 to become a second data stream in a series format to be transmitted through a high speed series transmission line (ex, low voltage differential signaling, LVDS). The traditional solution to reduce the sampling ambiguity in this situation is using three different clocks sel_0, sel_1 and sel_2 to respectively sample the data 0, data 1, and data 2 to produce a series of bits containing bit0, bit1 and bit2 in the frame K. Besides, it may happen that, due to the skew or jitter, the clock sel_0 samples data0 at the edge of sampling pulse clk1, and that still causes sampling ambiguity.

SUMMARY OF THE INVENTION

In order to solve the problems mentioned above, the present invention provides a skew-tolerance method and circuit for transferring digital data stream through multiple domains in an electrical circuit, such as a computing system.

In a preferred exemplary embodiment of present invention, the preferred exemplary embodiment provides a method for transferring a data stream with N parallel signals from a first clock domain to a second clock domain, wherein the N parallel signals are divided into a first group of parallel signals and a second group of parallel signals, and the N parallel signals are corresponding to N sampling pulses with a first sequence, and the method including: shifting the second group of parallel signals; and sequentially sampling each signal in the first group of parallel signals and the shifted second group of parallel signals by the N sampling pulses with a second sequence and outputting a serial signal, wherein the second sequence is different from the first sequence.

Accordingly, one embodiment of the present invention is a circuit for transferring a data stream with N parallel signals from a first clock domain to a second clock domain, wherein the N parallel signals are divided into a first group of parallel signals and a second group of parallel signals, and the N parallel signals are corresponding to N sampling pulses with a first sequence, and the circuit including: a shifting circuit for shifting the second group of parallel signals; and a sampling module for sequentially sampling each signal in the first group of parallel signals and the shifted second group of signals by the N sampling pulses with a second sequence and outputting a serial signal, wherein the second sequence is different from the first sequence.

Furthermore, another embodiment of the present invention provides A method for transferring a set of (Q*N) serial digital data from a first clock domain with a first sampling dock to a second dock domain with a second sampling clock, and the method including: dividing the set of (Q*N) serial digital data and generating Q digital data streams; and sequentially transferring the Q digital data streams to the second clock domain, wherein each digital data stream includes N parallel signals divided into a first group of parallel signals and a second group of parallel signals, and the N parallel signals are corresponding to N sampling pulses with a first sequence, and each digital data stream is transferred by the following steps: shifting the second group of parallel signals; and sequentially sampling each signal in the first group of parallel signals and the shifted second group of signals by the N sampling pulses with a second sequence and outputting a serial signal, wherein the second sequence is different from the first sequence.

Accordingly, one embodiment of the present invention is a circuit for transferring a set of (Q*N) serial digital data from a first clock domain with a first sampling clock to a second clock domain with a second sampling clock, and the circuit including: a divider for dividing the set of (Q*N) serial digital data and generating Q digital data streams; and a transmitter for sequentially transferring each of the Q digital data streams to the second clock domain, wherein each digital data stream includes N parallel signals divided into a first group of parallel signals and a second group of parallel signals, and the N parallel signals are corresponding to N sampling pulses with a first sequence. The transmitter comprises: a shifting circuit for shifting the second group of parallel signals; and a sampling module for sequentially sampling each signal in the first group of parallel signals and the shifted second group of signals by the N sampling pulses with a second sequence and outputting a serial signal, wherein the second sequence is different from the first sequence.

DETAILED DESCRIPTION OF THE INVENTION

The invention provides the method and circuit for transferring the data stream across different clock domains to avoid the problem of sampling ambiguity.

Figure 1A:
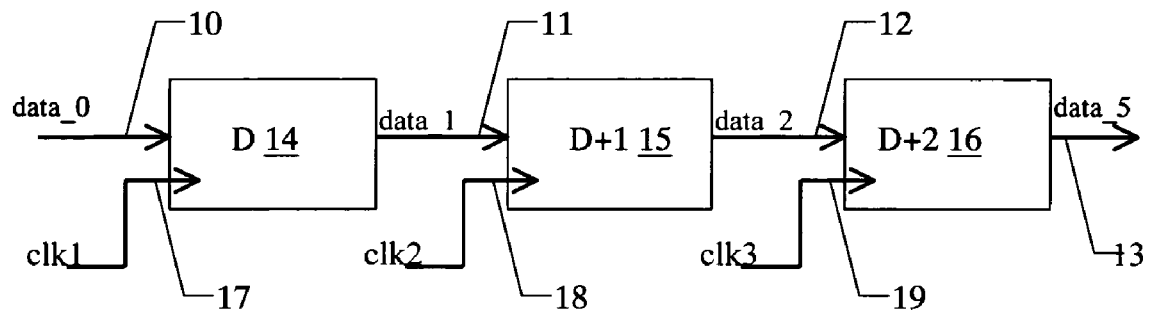
FIG. 1A is a block diagram of circuit for transferring data in three clock domains of prior art.
Figure 1B:
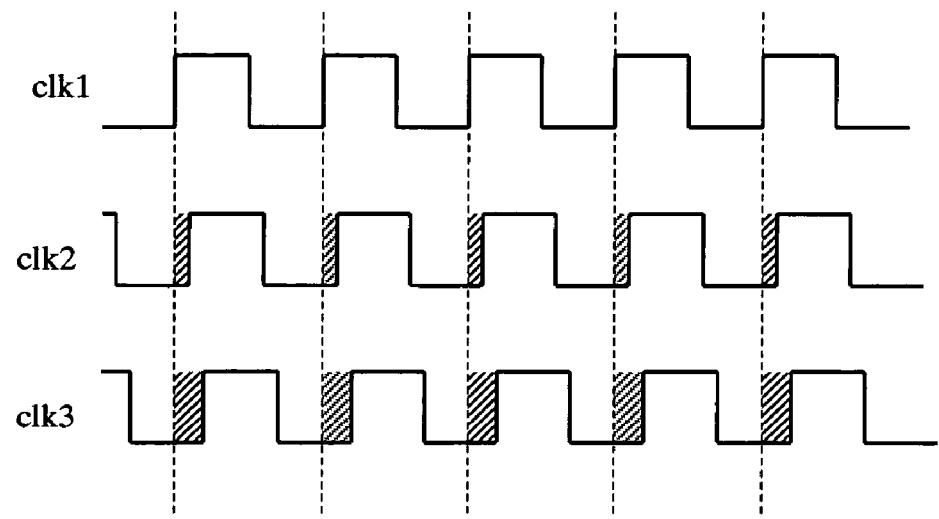
FIG. 1B is a timing diagram of sampling clocks in the circuit of FIG. 1A.
Figure 2:
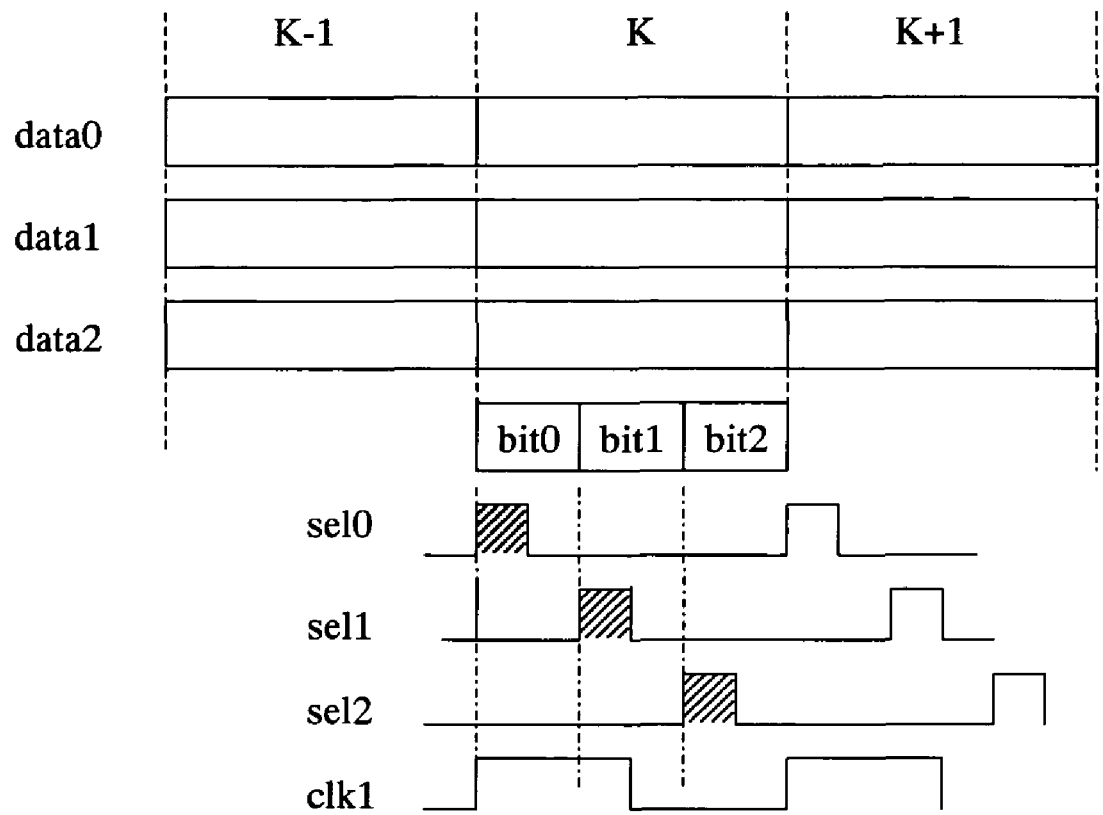
FIG. 2 is a timing diagram transferring data bits in prior art.
Figure 3:
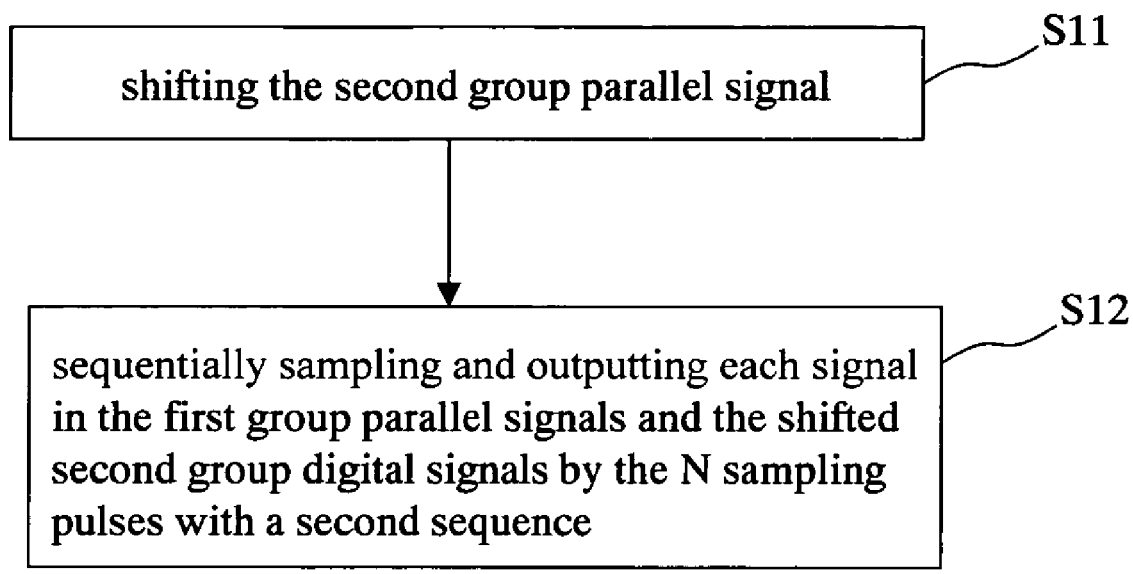
FIG. 3 is a method for transferring a data stream with N parallel signals from a first clock domain to a second clock domain in accordance with one embodiment of the present invention.

Referring to FIG. 3 is a method for transferring a data stream with N parallel signals from a first clock domain to a second clock domain. The N parallel signals include a first group of parallel signals and a second group of parallel signals, and the N parallel signals are corresponding to N sampling pulses with a first sequence in the second clock domain. The first sequence of N sampling pulses is from the first to the (M−1)th sampling pulse and from the Mth to the Nth sampling pulse, M is a predetermined integral. In step S11 the second group of parallel signal is shifted; and step S12 each signal in the first group of parallel signals and the shifted second group of parallel signals are sequentially sampled by the N sampling pulses with a second sequence and output a serial signal. The second sequence of N sampling pulses is from the Mth to the Nth sampling pulses and from the first to the (M−1)th sampling pulses. The second sequence is different from the first sequence.

In one embodiment according to the present invention in step S11 of FIG. 3, the second group of parallel signals have S parallel signals and each signal is shifted I times (to cause an offset of I sampling pulses) in one clock cycle of the second clock domain, wherein I is a predetermined integer. The first group of parallel signals have (N-S) parallel signals and each signal is shifted before sampling. The Lth parallel signal of the first group of parallel signals is shifted (L−1) times (to cause an offset of (L−1) sampling pulses) in one clock cycle of the second clock domain and L is an integer between 1 and (N-S).

In another embodiment according to the present invention in step S11 of FIG. 3, the second group of parallel signals has S parallel signals and each signal is shifted. The Kth parallel signal of the second group of parallel signals is shifted (K+I−1) times (to cause an offset of (K+I−1) sampling pulses) in one clock cycle of the second clock domain, wherein I is a predetermined integer and K is an integer between 1 and S. In step S12, the first group of parallel signals has (N-S) parallel signals and each signal is shifted before sampling. The Lth parallel signal of the first group of parallel signals is shifted (L−1) times (to cause an offset of (L−1) sampling pulses) in one clock cycle of the second clock domain and L is an integer between 1 and (N-S), that means the number of L is (N-S), and the range of L is from 1 to N.

Figure 4:
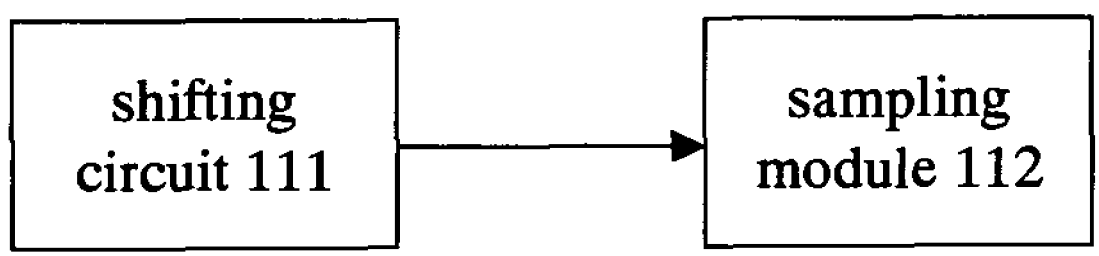
FIG. 4 is a circuit for transferring a data stream with N parallel signals from a first clock domain to a second clock domain in accordance with one embodiment of the present invention.

The FIG. 4 illustrates a circuit diagram for transferring a data stream with N parallel signals from a first clock domain to a second clock domain according to FIG. 3. The N parallel signals have a first group of parallel signals and a second group of parallel signals, and the N parallel signals are corresponding to the N sampling pulses with a first sequence. The circuit includes: a shifting circuit 111 for shifting the second group of parallel signals; and a sampling module 112 for sequentially sampling the first group of parallel signals and the shifted second group of signals by the N sampling pulses with a second sequence, which is different from the first sequence, and outputting a serial signal. The first sequence of N sampling pulses is from the first to the (M−1)th sampling pulses and from the Mth to the Nth sampling pulses. The second sequence of N sampling pulses is from the Mth to the Nth sampling pulses and from the first to the (M−1)th sampling pulses, where M is a first predetermined integer.

In one embodiment according to the present invention in FIG. 4, the shifting circuit 111 includes a plurality of gates corresponding to the second group of parallel signals, which has S parallel signals. Each gate is controlled by one of the N sampling pulses and the corresponding parallel signal is shifted I times (to cause an offset of I sampling pulses) in one clock cycle of the second clock domain, wherein I is a predetermined integer. The shifting circuit 111 further includes a plurality of gates for shifting a first group of parallel signals, which has (N-S) parallel signals. The Lth gate is corresponding to the Lth parallel signal of the first group of parallel signals and is controlled by the (L−1)th sampling pulse of the N sampling pulses. Therefore, the corresponding Lth parallel signal is shifted (L−1) times (to cause an offset of (L−1) sampling pulses) in one clock cycle of the second clock domain, where L is an integer between 1 and (N-S), that means the number of L is (N-S) and the range of L is from 1 to N.

In another embodiment according to the present invention in FIG. 4, the shifting circuit 111 includes a plurality of gates corresponding to a second group of parallel signals, which has S parallel signals. The Kth gate of the gates is controlled by the (K+I−1)th sampling pulse of the N sampling pulses and the corresponding parallel signal is shifted (K+I−1) times (to cause an offset of (K+I−1) sampling pulses) in one clock cycle of the second clock domain, where I is a predetermined integer and K is an integer between 1 and S, that means the number of K is S and the range of K is from 1 to N. The shifting circuit 111 includes another plurality of gates for shifting a first group of parallel signals, which has (N-S) parallel signals. The Lth gate corresponding to an Lth parallel signal of the first group of parallel signals is controlled by the (L−1)th sampling pulse of the N sampling pulses, and therefore, the corresponding Lth parallel signal is shifted (L−1) times (to cause an offset of (L−1) sampling pulses) in one clock cycle of the second clock domain, where L is an integer between 1 and (N-S), hat means the number of L is (N-S), and the range of L is from 1 to N.

Figure 5:
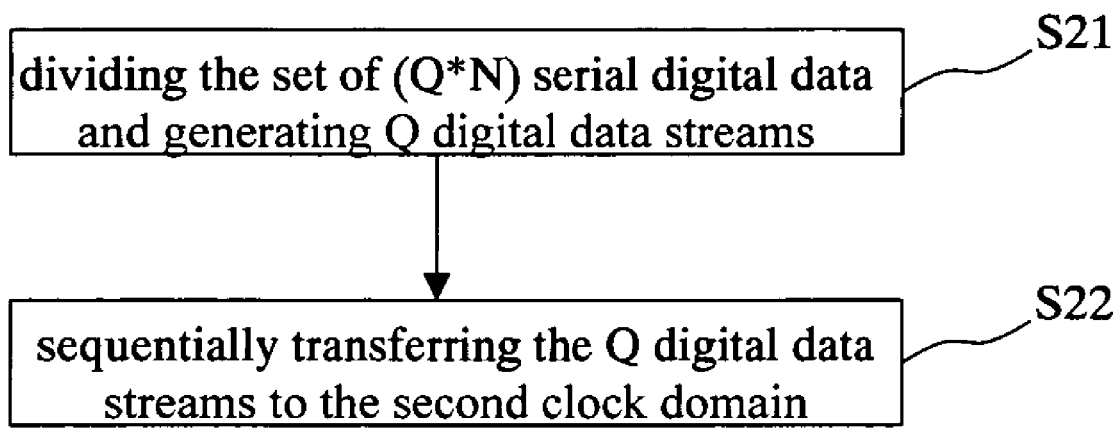
FIG. 5 is a method for transferring a data stream with N parallel signals from a first clock domain to a second clock domain in accordance with one embodiment of the present invention.

FIG. 5 is a sketch diagram of a method for transferring a set of (Q*N) serial digital data from a first clock domain with a first sampling clock into a second clock domain with a second sampling clock. In step S21, the set of (Q*N) serial digital data is divided into Q digital data streams; and in step S22, the Q digital data streams are sequentially transferred to the second clock domain. Each of Q digital data streams includes N parallel signals divided into a first group of parallel signals and a second group of parallel signals, and each of N parallel signals is corresponding to one of N sampling pulses with a first sequence. The second group of parallel signal is shifted. Each digital data stream is transferred by sampling the first group of parallel signals and the shifted second group of parallel signals by the N sampling pulses with a second sequence, which is different from the first sequence. The first sequence of N sampling pulses is from the first to the (M−1)th sampling pulses and from the Mth to the Nth sampling pulses, the second sequence of N sampling pulses is from the Mth to the Nth sampling pulses and from the first to the (M−1)th sampling pulses, where M is a predetermined integer.

In one embodiment according to the present invention in step S22, the second group of parallel signals have S parallel signals, and each signal is shifted I times (to cause an offset of I sampling pulses) in one clock cycle of the second clock domain, wherein I is a predetermined integer. The first group of parallel signals has (N-S) parallel signals, and each signal is shifted before sampling. The Lth parallel signal of the first group of parallel signals is shifted (L−1) times (to cause an offset of (L−1) sampling pulses) in one clock cycle of the second clock domain, where L is an integer between 1 and (N-S), that means the amount of L is (N-S) and the variation range is from 1 to N.

In another embodiment according to the present invention in step S22, the second group of parallel signals have S parallel signals and each signal is shifted. The Kth parallel signal of the second group of parallel signals is shifted (K+I−1) times (to cause an offset of (I+K−1) sampling pulses) in one clock cycle of the second clock domain, wherein I is a predetermined integer and K is an integer between 1 and S, that means the amount of K is S and the variation range is from 1 to N. In step S22, the first group of parallel signals has (N-S) parallel signals and each signal is shifted before sampling. The Lth parallel signal of the first group of parallel signals is shifted (L−1) times (to cause an offset of (L−1) sampling pulses) in one clock cycle of the second clock domain, where L is an integer between 1 and (N-S), that means the number of L is (N-S) and the range of L is from 1 to N.

Figure 6:
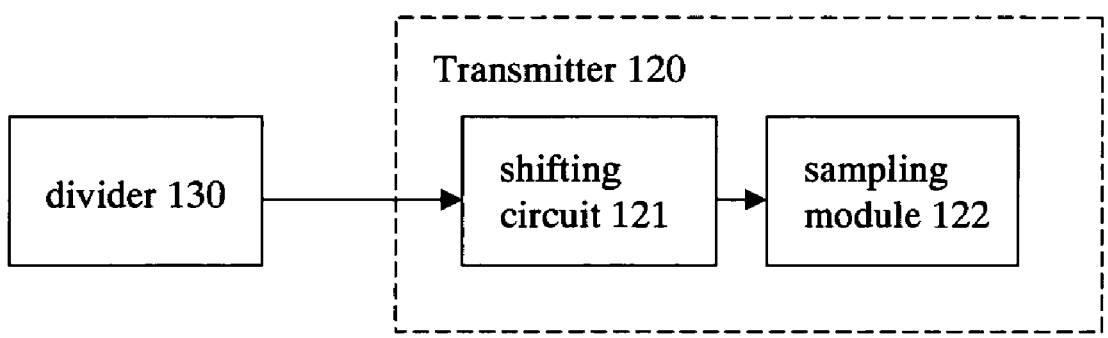
FIG. 6 is a circuit for transferring a data stream with N parallel signals from a first clock domain to a second clock domain in accordance with one embodiment of the present invention.

The FIG. 6 illustrates a circuit diagram for transferring a set of (Q*N) serial digital data from a first clock domain with a first sampling clock to a second clock domain with a second sampling clock. The circuit includes: a divider 130 for dividing the set of (Q*N) serial digital data and generating Q digital data streams; and a transmitter 120 for sequentially transferring each of the Q digital data streams to the second clock domain. Each digital data stream includes N parallel signals divided into a first group of parallel signals and a second group of parallel signals, and each of the N parallel signals is corresponding to one of N sampling pulses with a first sequence. In addition, the transmitter has a shifting circuit 121 for shifting the second group of parallel signals, and a sampling module 122 for sequentially sampling the first group of parallel signals and the shifted second group of parallel signals by the N sampling pulses with a second sequence, which is different from the first sequence, and outputting a serial signal. The first sequence of N sampling pulses is from the first to the (M−1)th sampling pulses and from the Mth to the Nth sampling pulses, the second sequence of N sampling pulses is from the Mth to the Nth sampling pulses and from the first to the (M−1)th sampling pulses, where M is a predetermined integer.

In one embodiment according to the present invention in FIG. 6, the shifting circuit 121 includes a plurality of gates corresponding to a second group of parallel signals, which has S parallel signals. Each gate is controlled by one of the N sampling pulses and the corresponding parallel signal is shifted I times (to cause an offset of I sampling pulses) in one clock cycle of the second clock domain, where I is a second predetermined integer. The shifting circuit 121 further includes another plurality of gates for shifting a first group of parallel signals, which has (N-S) parallel signals. The Lth gate is corresponding to the Lth parallel signal of the first group of parallel signals. The Lth gate is controlled by the (L−1)th sampling pulse of the N sampling pulses and the corresponding Lth parallel signal is shifted (L−1) times (to cause an offset of (L−1) sampling pulses) in one clock cycle of the second clock domain, where L is an integer between 1 and (N-S), that means the number of L is (N-S) and the range of L is from 1 to N.

In another embodiment according to the present invention in FIG. 6, the shifting circuit 121 includes a plurality of gates corresponding to a second group of parallel signals, which has S parallel signals. Kth gate of the gates is controlled by an (K+I−1)th sampling pulse of the N sampling pulses and the corresponding parallel signal is shifted (K+I−1) times (to cause an offset of (K+I−1) sampling pulses) in one clock cycle of the second clock domain, where I is a predetermined integral and the K is an integer between 1 and S, that mean the number of K is S and the range of K is from 1 to N. The shifting circuit 121 further includes another plurality of gates for shifting a first group of parallel signals, which has (N-S) parallel signals. The Lth gate of the gates corresponding to a Lth parallel signal of the first group of parallel signals is controlled by a (L−1)th sampling pulse of the N sampling pulses, and the corresponding Lth parallel signal is shifted (L−1) times (to cause an offset of (L−1) sampling pulses) in one clock cycle of the second clock domain, where L is an integer between 1 and (N-S), that means the number of L is (N-S) and the range of L is from 1 to N.

Figure 7A:
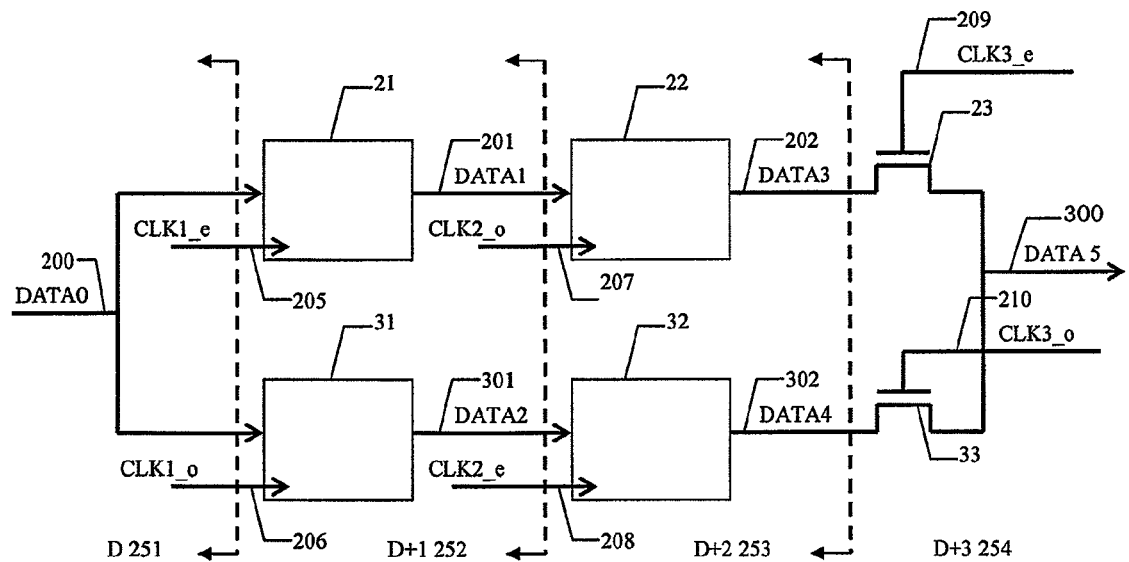
FIG. 7A is a block diagram of circuit for transferring data in multiple domains in accordance with one embodiment of the present invention.

FIG. 7A is a block diagram of a preferred exemplary embodiment of a circuit for transferring data stream in multiple clock domains with same frequency. A divider circuit (not shown) divides the sampling pulses of each of clock domains D+1 252, D+2 253, and D+3 254, which are respectively corresponding to CLK1, CLK2 and CLK3, into odd sampling pulses CLK1_e 205, CLK2_e 208, CLK3_e 209 and even sampling pulses CLK1_o 206, CLK2_o 207, CLK 3_o 210. The digital data stream DATA0 200 is respectively sampled by upper and lower routes. In the upper route, the sampling circuits 21, 22 use sampling pulse CLK1_e 205 and sampling pulse CLK2_o 207 to sample the digital data stream DATA0 200 and DATA1 201 in clock domains D+1 252 and D+2 253, respectively. In the lower route, the sampling circuits 31, 32 use sampling pulse CLK1_o 206 and sampling pulse CLK2_e 208 to sample the digital data stream DATA0 200 and DATA2 301 in clock domains D+1 252 and D+2 253, respectively. In the clock domain D+3 254, the sampled signal DATA3 202 and DATA4 302 respectively from the upper route and lower route are combined by the passing gates 23, 33 respectively controlled by sampling pulse CLK3_e 209 and sampling pulse CLK 3_o 210 to become a serial digital data DATA5 300.

Figure 7B:
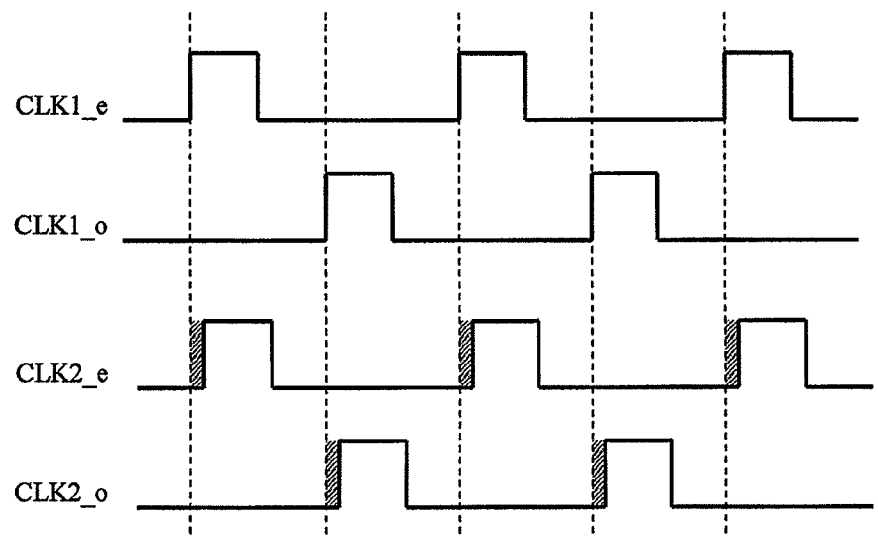
FIG. 7B is a timing diagram of sampling pulses in FIG. 3A in accordance with an embodiment of the present invention.

FIG. 7B is a timing diagram of the sampling pulses in FIG. 7A in accordance with an embodiment of the present invention. In the upper route, the time interval between the sampling edge of sampling pulse CLK1_e 205 and sampling pulse CLK2_o 207 is enough to have a better tolerance, and the skew or jitter at the sampling edge of sampling pulse CLK2_o 207 may not generate sampling ambiguity. In the lower route, the time interval between the sampling edge of sampling pulse CLK1_o 206 and sampling pulse CLK2_e 208 is enough to have a better tolerance, and the skew or jitter at the sampling edge of sampling pulse CLK2_e 208 also may not generate sampling ambiguity. Furthermore, the sampling pulses CLK1_e 205, CLK2_o 207, CLK1_o 206 and CLK2_e 208 respectively used in the sampling circuits 21, 22, 31, 32 and the sampling pulses CLK3_e 209 and CLK3_o 210 respectively used in the passing gates 23, 33 have the same frequency. The frequency of the sampling pulse CLK1 is equal to the sum of frequencies of the sampling pulses CLK1_e 205 and CLK1_o 206, the frequency of the sampling pulse CLK2 is equal to the sum of the sampling pulses CLK2_o 207 and CLK2_e 208, and frequency of CLK3 is equal to the sum of the sampling pulses CLK3_e 209 and CLK3_o 210. Moreover, both frequencies of sampling pulses CLK1_e 205 and CLK1_o 206 are the same, and frequencies of the sampling pulses CLK2_e 208 and CLK2_o 207 are the same, and frequencies of the sampling pulses CLK3_e 209 and CLK3_o 210 are the same. The phase difference between the sampling pulses CLK1_e 205 and CLK1_o 206 is half of the period of the sampling pulse CLK1_e 205 (which is equal to a period of the sampling pulse CLK1), and the phase difference between the sampling pulses CLK2_e 208 and CLK2_o 207 is half of the period of CLK2_o 207 (which is equal to a period of the sampling pulse CLK2), and the phase difference between the sampling pulses CLK3_e 209 and CLK3_o 210 is half of the period of the sampling pulse CLK3_e 209 (which is equal to a period of the sampling pulse CLK3).

Additionally, if N is an odd number, the sampling circuits in the upper route sample the digital data stream DATA0 200 from the first sampling pulse, the third sampling pulse, . . . to the Nth sampling pulse of CLK1 using CLK1_e in clock domain D+1 252, and each data of the sampled digital data stream (DATA1 201) is continuously sampled by CLK2_o in clock domain D+2 253, that shifts the sampled data stream to align with the 2nd sampling pulse, the 4th sampling pulse and so on of CLK2 to form a shifted sampled data stream DATA3 202. The sampling circuits in the lower route sample the digital data stream DATA0 200 from the 2nd sampling pulse, the 4th sampling pulse, . . . to the (N−1)th sampling pulse of CLK1 using CLK1_o in clock domain D+1 252, and each data of the sampled data stream (DATA2 301) is continuously sampled by CLK2_e in clock domain D+2 253, that shifts the sampled data stream to align with the 3rd sampling pulse, the 5th sampling pulse and so on of CLK2 to form another shifted sampled data stream DATA4 302. The combination circuit uses the passing gate 23 and the passing gate 33 to combine the shifted sampled data stream DATA3 202 of the upper route and the shifted sampled data stream DATA4 302 of the lower route by sampling pulses CLK3_e and CLK3_o in clock domain D+3 254, and then outputs a serial digital signal (data stream DATA5 300). The data stream of the upper route is sequentially sampled by CLK1_e, CLK2_o and CLK3_e in an odd-even sequence by turns, and the data stream of the lower route is sequentially sampled by CLK1_o, CLK2_e and CLK3_on an even-odd sequence by turns.

Furthermore, if N is an even number, the sampling circuits in the upper route sample the digital data stream DATA0 200 from the first sampling pulse, the third sampling pulse, . . . to the (N−1)th sampling pulses of CLK1 using CLK1_e in clock domain D+1 252, and each data of the sampled digital data stream (DATA1 201) is continuously sampled by CLK2_o in clock domain D+2 253, that shifts the sampled data stream to align with the 2nd sampling pulse, the 4th sampling pulse and so on of CLK2 to form a shifted sampled data stream DATA3 202. That means the digital data stream are sampled in odd-even sequence by turns. The sampling circuits in the lower route sample the digital data stream DATA0 200 from the 2nd sampling pulse, 4th sampling pulse, . . . to Nth sampling pulse of CLK1 using CLK1_o in clock domain D+1 252, and each data of the sampled data stream (DATA2 301) is continuously sampled by CLK2_e in clock domain D+2 253, that shifts the sampled data stream to align with the 3rd sampling pulse, 5th sampling pulse and so on of CLK2 to form another shifted sampled data stream DATA4 302. That means the digital data stream is sampled in even-odd sequence by turns. The combination circuit uses the passing gate 23 and the passing gate 33 to combine the shifted sampled data stream DATA3 202 of the upper route and the shifted sampled data stream DATA4 302 of the lower route by sampling pulses CLK3_e and CLK3_o in clock domain D+3 254, and then outputs a serial digital signal (data stream DATA5 300).

Figure 8:
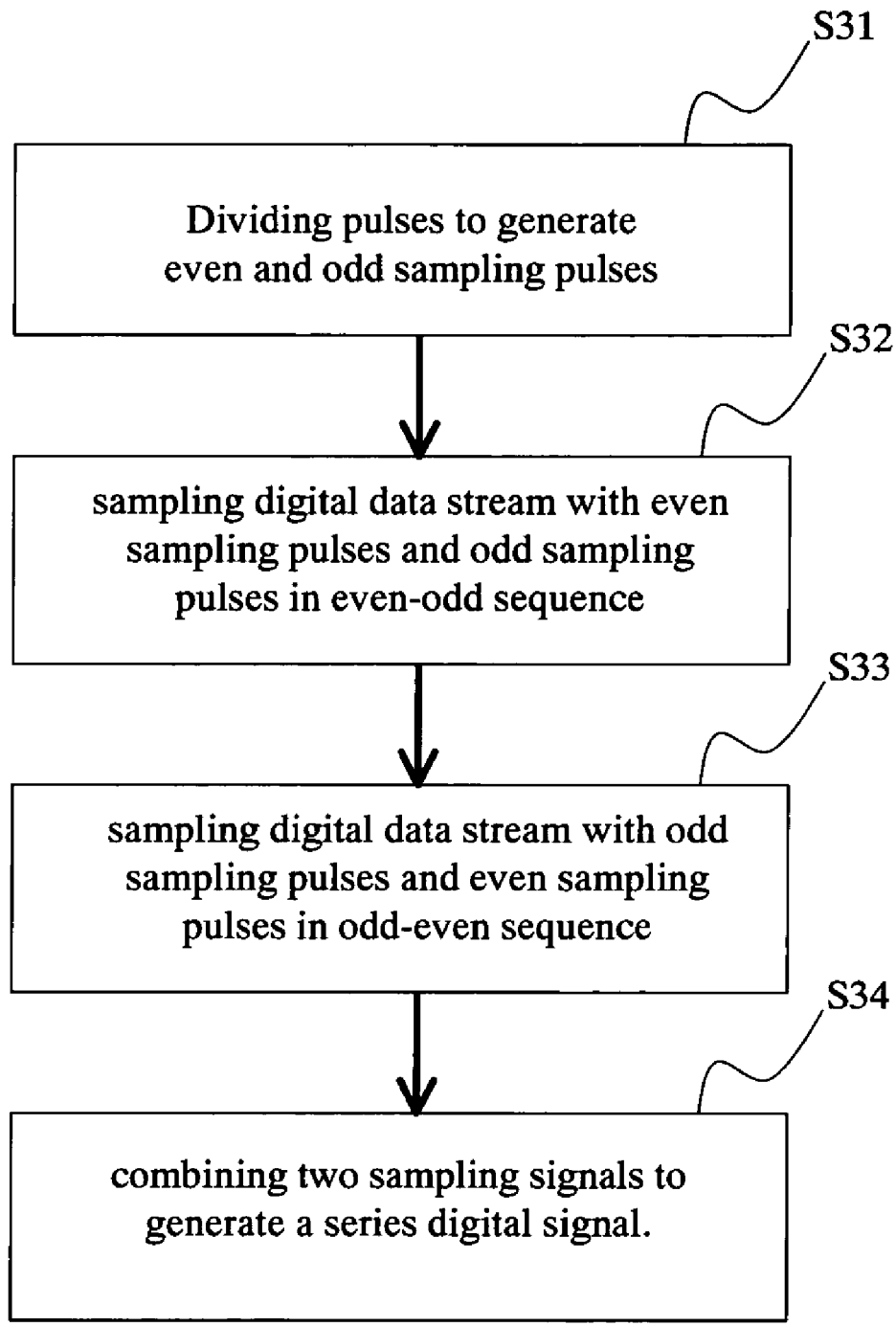
FIG. 8 is a flow chart of the method in accordance with an embodiment of the present invention.

FIG. 8 depicts a flow chart of the method in accordance with an embodiment of the present invention. The sampling pulses includes first sampling pulse, second sampling pulse, . . . (N−1)th sampling pulse and Nth sampling pulse. The digital data stream includes first digital signal, second digital signal . . . (N−1)th digital signal and Nth digital signal in parallel, and each digital signal corresponds to each sampling pulse in sequence. In step S31, the first sampling pulse, second sampling pulse . . . (N−1)th sampling pulse and Nth sampling pulse are divided into an odd sampling pulse which includes first sampling pulse, 3rd sampling pulse . . . , and an even sampling pulse, which includes 2nd sampling pulse, 4th sampling pulse . . . . In step S32, the digital data stream is sampled with the odd sampling pulse to generate an odd digital data stream, and then sampled by the even sampling pulse to shift the odd digital data stream to align with the next even sampling pulses in the even sampling pulse. In step S33, the digital data stream is sampled with the even sampling pulse to generate an even digital data stream, and then sampled by the odd sampling pulse to shift the even digital data stream to align with the next odd sampling pulses in the odd sampling pulse. In step S34, the odd digital data stream is sampled by the odd sampling pulse and the even digital data stream is sampled by the even sampling pulse, and the sampled data are combined into a serial digital signal.

Additionally, if N is an odd number, in the step S32, the sampling circuits sample the digital data stream with the odd sampling pulse containing the first sampling pulse, 3rd sampling pulse, and Nth sampling pulse and then with the even sampling pulse to obtain an odd digital data stream; and in step S33, sampling circuits sample the digital data stream with the even sampling pulse containing the 2nd sampling pulse, 4th sampling pulse, . . . and (N−1)th sampling pulse and then with the odd sampling pulse to obtain an even digital data stream. In the step S34, the odd digital data stream and the even digital data stream are respectively sampled by the odd sampling pulse and even sampling pulse to be output as a serial digital signal.

Furthermore, if N is an even number, in step S32, the sampling circuits sample the digital data stream with the odd sampling pulse containing the first sampling pulse, 3rd sampling pulse, . . . and (N−1)th sampling pulse, and then with the even sampling pulse to obtain an odd digital data stream. In step S33, sampling circuits sample the digital data stream with the even sampling pulse containing the 2nd sampling pulse, 4th sampling pulse, . . . and Nth sampling pulse, and then with the odd sampling pulse to obtain an even digital data stream. In the step S34, the odd digital data stream and the even digital data stream are respectively sampled by the odd sampling pulse and even sampling pulse to be output as a serial digital signal.

Figure 9:
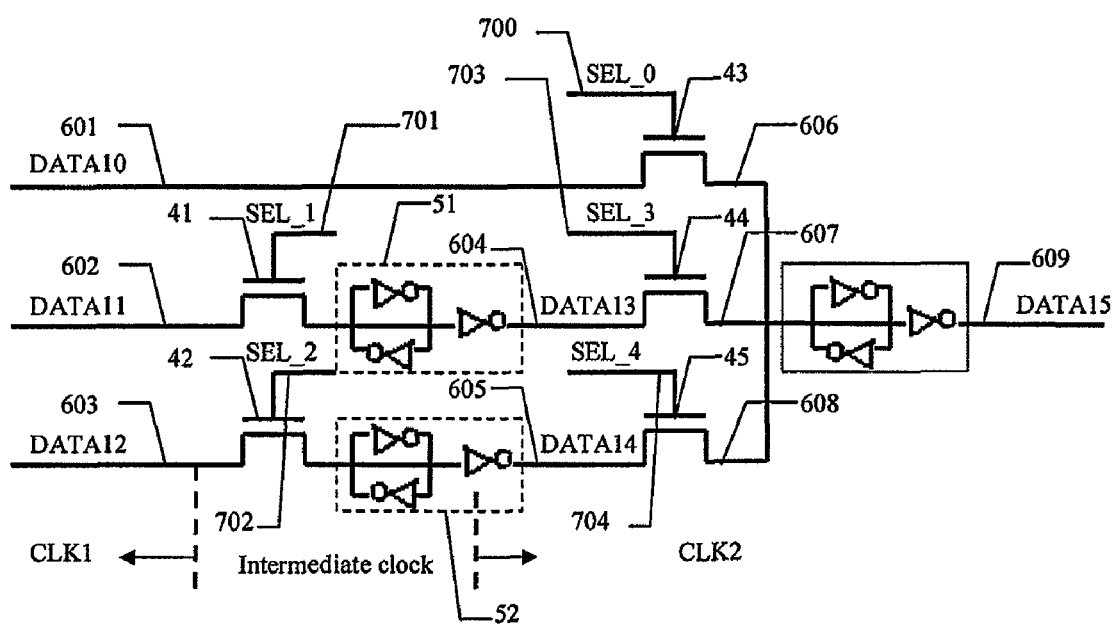
FIG. 9 is a block diagram of circuit in accordance with one embodiment of the present invention.
Figure 10:
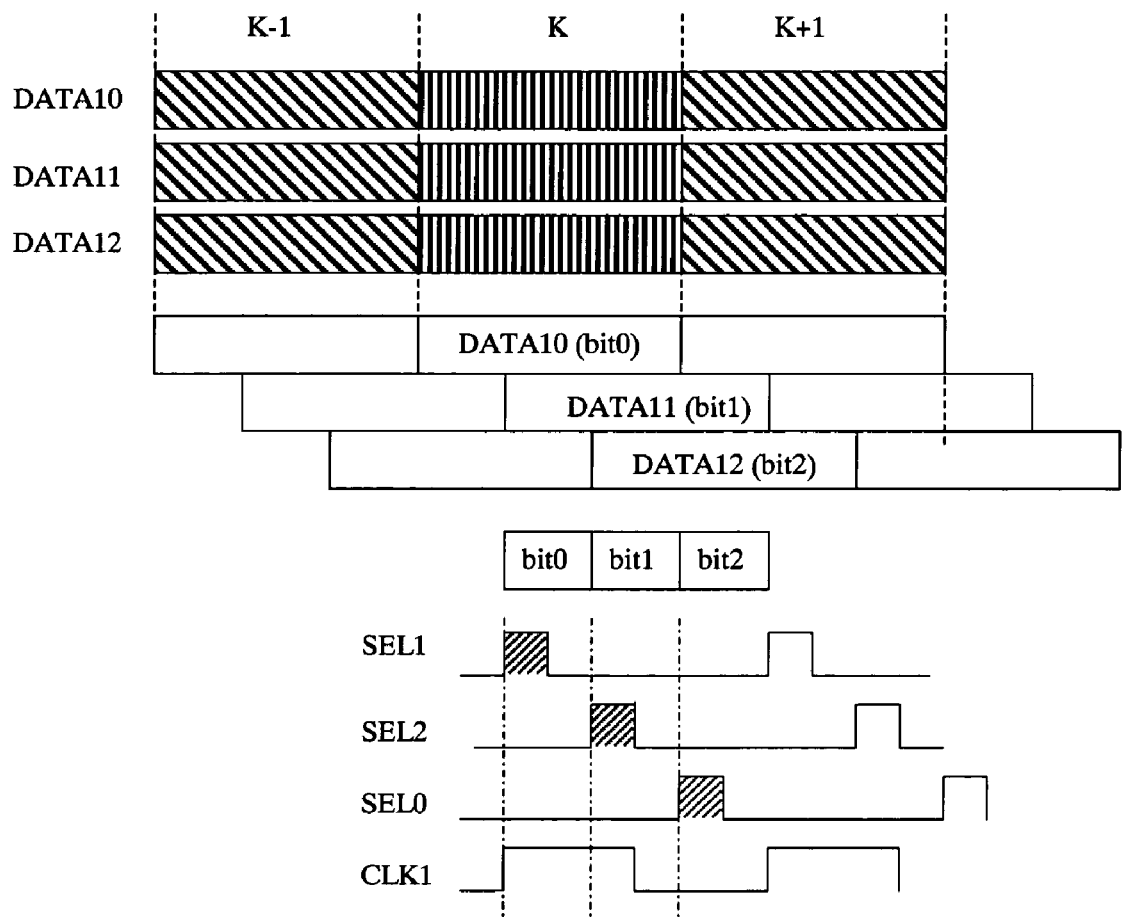
FIG. 10 is a timing diagram of sampling pulses in FIG. 5 in accordance with an embodiment of the present invention.

FIG. 9 is a block diagram of a preferred exemplary embodiment of a circuit for transferring data stream across multiple clock domains. The digital data stream includes three parallel bits (DATA10 601, DATA11 602, and DATA12 603). The bit DATA11 602 is sampled by sampling pulse SEL_1 701 in the sampling circuit 41 and then stored in the register 51 for shifting ⅓ period. The bit DATA12 603 is sampled by sampling pulse SEL_2 702 in the sampling circuit 42 and then stored in the register 52 for shifting ⅔ period. Therefore, an intermediated clock domain is created by such preliminary sampling and shifting. The un-shifted data bit DATA10 601, the shifted data bit DATA13, and the shifted data bit DATA14 is then sampled by sampling pulses SEL_0 700, SEL_3 703 and SEL_4 704 in the sampling circuit 43, 44, 45 respectively and combined to become a serial data stream DATA15 609. As a result, referring to FIG. 10, the time interval is long enough to have the better tolerance for sampling pulse SEL_1 701 to sample data bit DATA11 602, sampling pulse SEL_2 702 to sample data bit DATA12 603, and sampling pulse SEL_0 700 to sample data bit DATA10 601, thus the sampling ambiguity will not happen.

Continuously referring to FIG. 9, the phase difference between the shift data bit DATA1 1 602 and the data bit DATA13 604 is 1/N of the clock cycle in first clock domain, and the phase difference between the shift data bit DATA12 603 and the data bit DATA14 605 is 2/N of the clock cycle in first clock domain, wherein N is total parallel number 3. Moreover, the sampling pulses SEL_0 700, SEL_1 701, SEL_2 702 have the same frequency. That means each of sampling pulses has the same frequency as the second clock, but with different phase. The phase different of each two continuous sampling pulses is fixed, such as the 1/N clock cycle in the above example, and one clock cycle includes N sampling pulses.

Figure 11:
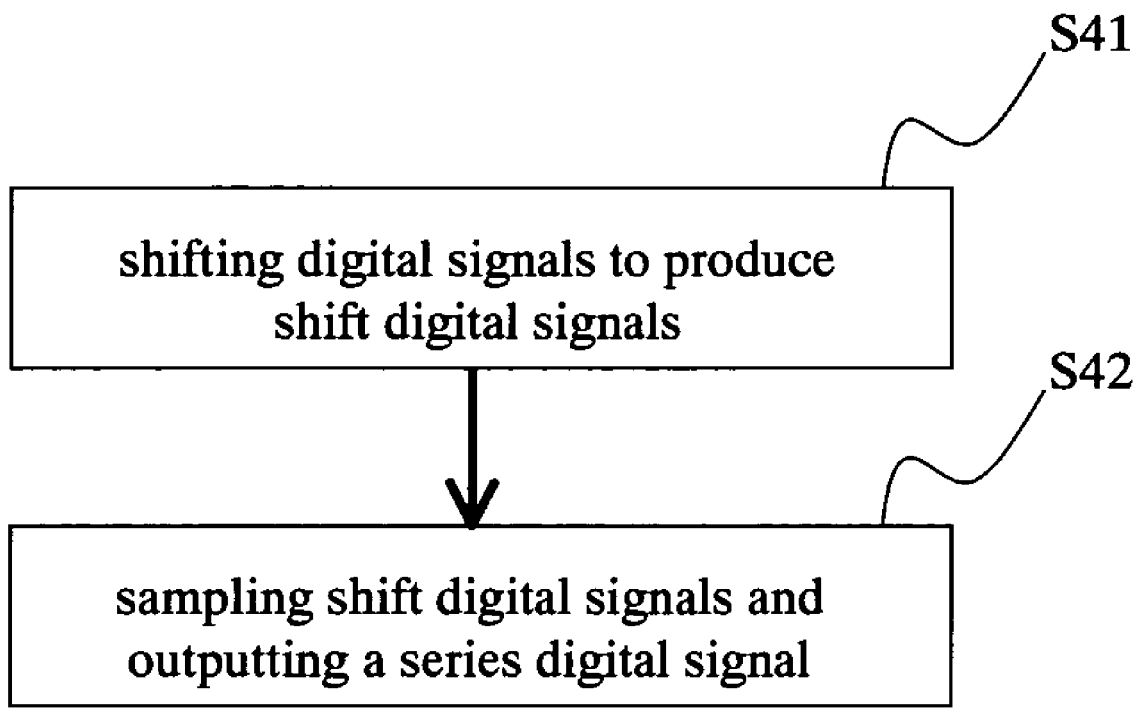
FIG. 11 is a flow chart of the method in accordance with an embodiment of the present invention.

Accordingly, FIG. 11 depicts a flow chart of the method in accordance with an embodiment of the present invention. The sampling pulse stream is in first clock domain and comprises the first sampling pulse, second sampling pulse . . . (N−1)th sampling pulse and Nth sampling pulse. The digital data stream includes first digital signal, second digital signal . . . (N−1)th digital signal and Nth digital signal in parallel, and each digital signal corresponds to an sampling pulse in sequence. In step S41, second digital signal, third digital signal . . . (N−1)th digital signal and Nth digital signal are shifted to produce second shift digital signal, third shift digital signal . . . (N−1)th shift digital signal and Nth shift digital signal, and in step S42, the first unshift digital signal, second shift digital signal . . . (N−1)th shift digital signal and Nth shift digital signal are sampled by first sampling pulse, second sampling pulse, third sampling pulse . . . (N−1)th sampling pulse and Nth sampling pulse respectively to output a serial digital signal, which is low voltage differential signaling (LVDS) or reduced swing differential signaling (RSDS).

Accordingly, one embodiment of the present invention provides an effective data transfer circuit and method that allows digital data transferring multiple clock domains be sampled with plurality of sampling pulses. As a result, the unwanted data transferring error, such as phase difference and sampling ambiguity caused by skew and jitter may not happen.

Although the present invention has been explained in relation to its preferred embodiment, it is to be understood that other modifications and variation can be made without departing the spirit and scope of the invention as hereafter claimed.

What is claimed is:

1. A method for transferring a data stream with N parallel signals from a first clock domain to a second clock domain, the N parallel signals divided into a first group of parallel signals and a second group of parallel signals, and the N parallel signals corresponding to N sampling pulses with a first sequence, wherein N is an integer, and the method comprising:
   (a) shifting the second group of parallel signals; and
   (b) sequentially sampling each signal in the first group of parallel signals and the shifted second group of parallel signals by the N sampling pulses with a second sequence and outputting a serial signal, wherein the second sequence is different from the first sequence, and the first sequence is from first to (M−1)th sampling pulses and from Mth to Nth sampling pulses, and the second sequence is from Mth to Nth sampling pulses and from first to (M−1)th pulses, wherein M is a predetermined integer less than N.

2. The method according to claim 1, wherein the second group of parallel signals has S parallel signals, and each signal in the second group of parallel signals is shifted I times in one clock cycle of the second clock domain in step (a), wherein I is a predetermined integer and S is an integer.

3. The method according to claim 2, wherein the first group of parallel signals has (N−S) parallel signals, and the method further comprises:
   shifting each signal in the first group of parallel signals before sampling in step (b), wherein an Lth parallel signal of the first group of parallel signals is shifted (L−1) times in one clock cycle of the second clock domain, wherein L is an integer between 1 and (N−S) and S ranges from 0 to (N−1), that means the number of L is (N−S) and the range of L is from 1 to N.

4. The method according to claim 1, wherein the second group of parallel signals has S parallel signals and each signal in the second group of parallel signals is shifted in step (a), wherein a Kth parallel signal in the second group of parallel signals is shifted (K+I−1) times in one clock cycle of the second clock domain, wherein I is a predetermined integer and K is an integer between 1 and S and S ranges from 1 to N, that means the number of K is S and the range of K is from 1 to N.

5. The method according to claim 4, wherein the first group of parallel signals has (N−S) parallel signals, and the method further comprises:
   shifting each signal in the first group of parallel signals before sampling in step (b), wherein a Lth parallel signal in the first group of parallel signals is shifted (L−1) times in one clock cycle of the second clock domain, wherein L is an integer between 1 and (N−S) and S ranges from 1 to (N−1), that means the number of L is (N−S) and the range of L is from 1 to N−1.

6. A circuit for transferring a data stream with N parallel signals from a first clock domain to a second clock domain, the N parallel signals divided into a first group of parallel signals and a second group of parallel signals, and the N parallel signals corresponding to N sampling pulses with a first sequence, wherein N is an integer, and the circuit comprises:
   a shifting circuit for shifting the second group of parallel signals; and
   a sampling module for sequentially sampling each signal in the first group of parallel signals and the shifted second group of parallel signals by the N sampling pulses with a second sequence and outputting a serial signal, wherein the second sequence is different from the first sequence, and the first sequence is from first to (M−1)th sampling pulses and from Mth to Nth sampling pulses, and the second sequence is from Mth to Nth sampling pulses and from first to (M−1)th sampling pulses, wherein M is a predetermined integer less than N.

7. The circuit according to claim 6, wherein the second group of parallel signals has S parallel signals, and the shifting circuit includes S gates corresponding to the second group of parallel signals, and each gate of the second plurality of gates is controlled by one of the N sampling pulses and the corresponding parallel signal is shifted I times in one clock cycle of the second clock domain, wherein I is a predetermined integer and S is an integer.

8. The circuit according to claim 7, wherein the first group of parallel signals has (N-S) parallel signals, and the shifting circuit further comprises:
a first plurality of gates for shifting the first group of parallel signals, wherein an Lth gate in the first plurality of gates corresponding to a Lth parallel signal in the first group of parallel signals is controlled by a (L−1)th sampling pulse of the N sampling pulses, and the corresponding Lth parallel signal is shifted (L−1) times in one clock cycle of the second clock domain, wherein L is an integral between 1 and (N-S) and S ranges from 0 to (N−1), that means the number of L is (N-S) and the range of L is from 1 to N.

9. The circuit according to claim 6, wherein the second group of parallel signals has S parallel signals and the shifting circuit includes a second plurality of gates corresponding to the second group of parallel signals, wherein a Kth gate of the second plurality of gates is controlled by a (K+I−1)th sampling pulse of the N sampling pulses and the corresponding parallel signal is shifted (K+I−1) times in one clock cycle of the second clock domain, wherein I is a predetermined integer and K is an integer between 1 and S and S ranges from 1 to N, that means the number of K is S and the range of K is from 1 to N.

10. The circuit according to claim 9, wherein the first group of parallel signals has (N-S) parallel signals, and the shifting circuit further comprises:
a first plurality of gates for shifting the first group of parallel signals, wherein a Lth gate in the first plurality of gates corresponding to a Lth parallel signal in the first group of parallel signals is controlled by a (L−1)th sampling pulse of the N sampling pulses, and the corresponding Lth parallel signal is shifted (L−1) times in one clock cycle of the second clock domain, wherein L is an integer between 1 and (N-S) and S ranges from 1 to (N−1), that means the number of L is (N-S) and the range of L is from 1 to N−1.

11. A method for transferring a set of (Q*N) serial digital data from a first clock domain with a first sampling clock to a second clock domain with a second sampling clock, wherein Q and N are integers, and the method comprising:
(a) dividing the set of (Q*N) serial digital data into Q digital data streams; and
(b) sequentially transferring the Q digital data streams to the second clock domain, and each digital data stream including N parallel signals divided into a first group of parallel signals and a second group of parallel signals, and the N parallel signals corresponding to N sampling pulses with a first sequence, and each digital data stream being transferred by the following steps:
(b1) shifting the second group of parallel signals; and
(b2) sequentially sampling each signal in the first group of parallel signals and the shifted second group of parallel signals by the N sampling pulses with a second sequence and outputting a serial signal, wherein the second sequence is different from the first sequence, and the first sequence is from first to (M−1)th sampling pulse and from Mth sampling pulse to Nth sampling pulse, and the second sequence is from Mth to Nth sampling pulses and from first to (M−1)th sampling pulses, wherein M is a predetermined integer.

12. The method according to claim 11, wherein the second group of parallel signals has S parallel signals, and each signal in the second group of parallel signals is shifted I times in one clock cycle of the second clock domain in step (b1), wherein I is a predetermined integer and S is an integer.

13. The method according to claim 12, wherein the first group of parallel signals has (N-S) parallel signals, and the method further comprises:
shifting each signal in the first group of parallel signals before sampling in step (b2), and a Lth parallel signal in the first group of parallel signals is shifted (L−1) times in one clock cycle of the second clock domain, wherein L is an integer between 1 and (N-S) and S ranges from 0 to (N−1), that means the number of L is (N-S) and the range of L is from 1 to N.

14. The method according to claim 11, wherein the second group of parallel signals has S parallel signals, and each signal in the second group of parallel signals is shifted in step (b1), and a Kth parallel signal in the second group of parallel signals is shifted (K+I−1) times in one clock cycle of the second clock domain, wherein I is a predetermined integer and K is an integer between 1 and S and S ranges from 1 to N that means the number of K is S and the range of K is from 1 to N.

15. The method according to claim 14, wherein the first group of parallel signals has (N-S) parallel signals, and the method further comprises:
shifting each signal in the first group of parallel signals before sampling in step (b2), wherein a Lth parallel signal in the first group of parallel signals is shifted (L−1) times in one clock cycle of the second clock domain, wherein L is an integer between 1 and (N-S) and S ranges from 1 to (N−1), that means the number of L is (N-S) and the range of L is from 1 to N−1.

16. A circuit for transferring a set of (Q*N) serial digital data from a first clock domain with a first sampling clock to a second clock domain with a second sampling clock, wherein Q and N are integers, and the circuit comprising:
a divider for dividing the set of (Q*N) serial digital data and generating Q digital data streams; and
a transmitter for sequentially transferring each of the Q digital data streams to the second clock domain, and each digital data stream including N parallel signals divided into a first group of parallel signals and a second group of parallel signals, and the N parallel signals being corresponding to N sampling pulses with a first sequence, and the transmitter comprising:
a shifting circuit for shifting the second group of parallel signals; and
a sampling module for sequentially sampling each signal in the first group of parallel signals and the shifted second group of parallel signals by the N sampling pulses with a second sequence and outputting a serial signal, wherein the second sequence is different from the first sequence, and the first sequence of N sampling pulses is from a first to a (M−1)th sampling pulses and from Mth to Nth sampling pulses, and the second sequence of N sampling pulses is from Mth to Nth sampling pulses and from first to (M−1)th sampling pulses, wherein M is a predetermined integral less than N.

17. The circuit according to claim 16, wherein the second group of parallel signals has S parallel signals and the shifting circuit includes a second plurality of gates corresponding to the second group of parallel signals, and each gate is controlled by one of the N sampling pulses and the corresponding parallel signal is shifted I times in one clock cycle of the second clock domain, wherein I is a second predetermined integer and S is an integer.

18. The circuit according to claim 17, wherein the first group of parallel signals has (N-S) parallel signals, and the shifting circuit further comprises:
   a first plurality of gates for shifting the first group of parallel signals, wherein a Lth gate in the first plurality of gates corresponding to a Lth parallel signal in the first group of parallel signals is controlled by a (L−1)th sampling pulse of the N sampling pulses, and the corresponding Lth parallel signal is shifted (L−1) times in one clock cycle of the feat clock domain, wherein L is an integer between 1 and (N-S) and S ranges from 0 to (N−1), that means the number of L is (N-S) and the range of L is from 1 to N.

19. The circuit according to claim 16, wherein the second group of parallel signals has S parallel signals and the shifting circuit includes a second plurality of gates corresponding to the second group of parallel signals, wherein a Kth gate of the second plurality of gates is controlled by an (K+I−1)th sampling pulse of the N sampling pulses and the corresponding parallel signal is shifted (K+I−1) times in one clock cycle of the second clock domain, wherein I is a second predetermined integer and K is an integer between 1 and S and S ranges form 1 to N, that means the number of K is S and the range of K is from 1 to N.

20. The circuit according to claim 19, wherein the first group of parallel signals has (N-S) parallel signals, and the shifting circuit further comprises:
   a first plurality of gates for shifting the first group of parallel signals, wherein a Lth gate in the first plurality of gates corresponding to a Lth parallel signal in the first group of parallel signals is controlled by a (L−1)th sampling pulse of the N sampling pulses, and the corresponding Lth parallel signal is shifted (L−1) times in one clock cycle of the second clock domain, wherein L is an integer between 1 and (N-S) and S ranges from 1 to (N−1), that means the number of L is (N-S) and the range of L is from 1 to N−1.

* * * * *